US008842547B2

United States Patent
Suzuki (10) Patent No.: US 8,842,547 B2
(45) Date of Patent: Sep. 23, 2014

(54) COMMUNICATION CONTROL APPARATUS AND CONTROL METHOD

(75) Inventor: Motoharu Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 13/188,022

(22) Filed: Jul. 21, 2011

(65) Prior Publication Data

US 2012/0033557 A1    Feb. 9, 2012

(30) Foreign Application Priority Data

Aug. 4, 2010   (JP) ................................. 2010-175735

(51) Int. Cl.
*H04L 12/26* (2006.01)
*H04L 1/00* (2006.01)

(52) U.S. Cl.
CPC .......... *H04L 43/0847* (2013.01); *H04L 1/0061* (2013.01)
USPC ....................................................... 370/241

(58) Field of Classification Search
CPC ........ H04L 69/16; H04L 69/161; H04L 69/12
USPC .................. 370/310, 392, 469; 709/230, 250
See application file for complete search history.

(56) References Cited

U.S. PATENT DOCUMENTS

| | | | |
|---|---|---|---|
| 7,321,599 B1 * | 1/2008 | Yen et al. ....................... | 370/466 |
| 8,351,445 B1 * | 1/2013 | Kaniz et al. .................... | 370/413 |
| 2005/0192782 A1 * | 9/2005 | Lee ................................... | 703/2 |
| 2006/0007935 A1 * | 1/2006 | Bennett et al. ............. | 370/395.5 |
| 2006/0274788 A1 * | 12/2006 | Pong ............................. | 370/469 |

FOREIGN PATENT DOCUMENTS

EP    1124362 A2 *   8/2001

OTHER PUBLICATIONS

Microsoft Press, Microsoft Computer Dictionary, Fifth Edition, 2002, ISBN 0735614954. total pp. 637.*
English-language translation of Japanese Patent Document No. 2003-143221 A.
English-language translation of Japanese Patent Document No. 2003-289315 A.
English-language translation of Japanese Patent Document No. 2006-050503 A.

* cited by examiner

*Primary Examiner* — Jeffrey M Rutkowski
*Assistant Examiner* — Peter Mak
(74) *Attorney, Agent, or Firm* — Fitzpatrick, Cella, Harper & Scinto (57) ABSTRACT

A communication control apparatus transfers received data from an external unit to a first memory unit, and at the same time transferring a header portion of the received data to a second memory unit, and performs addition operations the received data transferred to the first memory unit to obtain a checksum value of the received data. It analyzes the header portion transferred to the second memory unit in response to the completion of transferring the header portion to the second memory unit. Then, it acquires an addition value for the region except object regions of checksum for determining an error in the received data, and determines the error in the received data using the result of the addition operation for the received data by the adding unit and the addition value acquired by the acquiring unit.

8 Claims, 7 Drawing Sheets

COMMUNICATION CONTROL APPARATUS AND CONTROL METHOD

BACKGROUND OF THE INVENTION

1. Field of the Invention

The present invention relates to a communication control apparatus and a control method.

2. Description of the Related Art

During recent years, a variety of devices have been directly connected to wire/wireless networks. As examples of such devices, there are a mobile terminal, a printer, a camera, a copying machine, a display, a video apparatus, an acoustic apparatus and others. The processing ability of the main CPUs installed on these devices is often lower than that of CPUs installed on personal computers. The following two methods are considered when Internet standard protocols such as TCP/UDP/IP normally used in networks attempt to realize using resources of such devices.

The first method is to execute TCP/IP protocol stacks with a main CPU. In this situation, the main CPU has to execute at least the communication process and the application process. If a communication process and an application process are performed in parallel, the processing speed of either one process or both processes is possibly decreased The second method is to give the main CPU independence from the communication process. More specifically, there is a method of utilizing an auxiliary device specifically performing a protocol process such as TOE (TCP/IP offload engine) or the method of executing protocol stacks using a sub-CPU which is independent from the main CPU. In this method, the effect on the process ability given by each of the communication process and the application process becomes small because the main CPU is independent from the communication process.

The method regarding TOE has been proposed in Japanese Patent Laid-Open No. 2003-143221 (hereafter, Document 1). Document 1 shows the TCP/IP engine which has an interface with an application CPU executing applications and has an arbitration function of sending by priority the application data input from the application CPU. Further, it shows the method of how to use DMA (Direct Memory Access) in order to transfer the application data between the application CPU and TCP/IP engine.

The data processing method in communication process has been proposed in Japanese Patent Laid-Open No. 2005-137022 (hereafter, Document 2). Document 2 shows the method of processing packets after separating each received packets into a header and data and copying them respectively into different regions. The integrated circuit which can be applied to a communication control apparatus has been proposed in Japanese Patent Laid-Open No. 2006-050503 (hereafter, Document 3). Document 3 shows the method of analyzing received packets, determining the area of memory on which the packets should be copied based on the result of analysis, and transferring the packets to the determined area.

It is common to copy received packets into reception buffers in order to analyze them after the packets including a header and a data portion are received from a network. If the object of the analysis is only a header portion in the received packets, and assuming that the analysis is started after copying all contents including the header portion and the data portion into the reception buffer, wasted latency by starting the analysis will be required. In this way, the throughput of communication may be decreased.

It is possible to perform the analysis before finishing the copy process if the packets are copied into the reception buffer by using the device, for example, DMAC (Direct Memory Access Controller) which is independent from the device having analysis function such as CPU and others. That is, if the CPU performs the analysis of the header portion just after the header portion is finished copying via DMA, the analysis process and the copy process of the data can be performed in parallel even while DMAC copies the packets. However, if all of the header portion and the data portion are copied into the buffer on the same memory, the following problems will occur. That is, the processing efficiency can be decreased because the memory access for the copy of the data portion using DMA and the memory access by CPU for the header analysis compete against each other.

SUMMARY OF THE INVENTION

In order to solve the above problems, one of the embodiments of the present invention provides a communication control apparatus and a control method which enhance the efficiency of the communication process when receiving data from an external device in accordance with a predetermined communication protocol.

According to one aspect of the present invention, there is provided a communication control apparatus comprising: a receiving unit configured to receive data from an external unit; a transferring unit configured to transfer the data received from the receiving unit to a first memory unit, and at the same time to transfer a header portion of the received data to a second memory unit; an adding unit configured to perform addition operations the received data transferred to the first memory unit to obtain a checksum value of the received data; an analyzing unit configured to analyze the header portion transferred to the second memory unit in response to the completion of transferring the header portion to the second memory unit; an acquiring unit configured to acquire an addition value for the region except object regions of checksum for determining an error in the received data; and a determining unit configured to determine the error in the received data using the result of the addition operation for the received data by the adding unit and the addition value acquired by the acquiring unit.

Further features of the present invention will become apparent from the following description of exemplary embodiments with reference to the attached drawings.

DESCRIPTION OF THE EMBODIMENTS

Hereafter, the preferred embodiment of the present invention is described referring to attached drawings. In addition, although Ethernet (registered trademark) II for the specification of wire communication and IEEE802.11 for the specification of wireless communication will be further explained as examples, it should be understood that the scope of the present invention to be applied is not limited to these examples.

Figure 1:
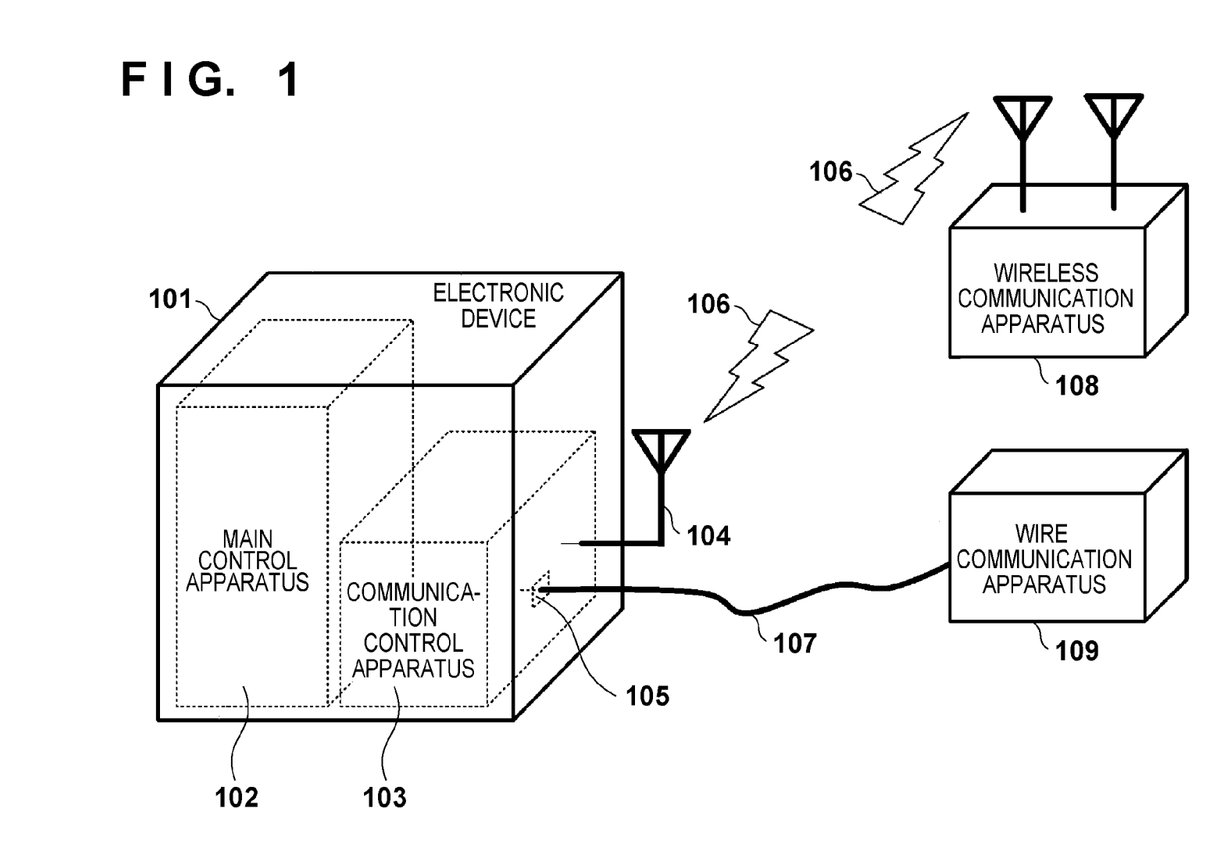
FIG. 1 shows an exemplary configuration of system in first embodiment.

FIG. 1 is a drawing indicating an example of the system to which a communication control apparatus 103 is applied in this embodiment. An electronic device 101 accommodates a communication control apparatus 103 and a main control apparatus 102. The main control apparatus 102 is an apparatus to control applications of an electronic device 101. The main control apparatus 102 controls the application for display, for example, if the electronic device 101 is a television, and it controls the application for printing if the electronic device 101 is a printer.

The communication control apparatus 103 performs the communication process for the electronic device 101 which is not performed by the main control apparatus 102. In addition, it is assumed that the communication control apparatus 103 can utilize both wireless communication and wire communication in this embodiment. An antenna 104 is an example of external interface for wireless communication, and a cable socket 105 is an example of external interface for wire communication. Each of the communication interfaces establishes a network with other devices via each communication medium. For example, in the case of wireless communication, a wireless network is established with a link from the antenna 104 to a wireless communication apparatus 108 via air 106. In the case of wire communication, a wire network is established with a link from the cable socket 105 to other wire communication apparatus 109 via cable 107.

Figure 2:
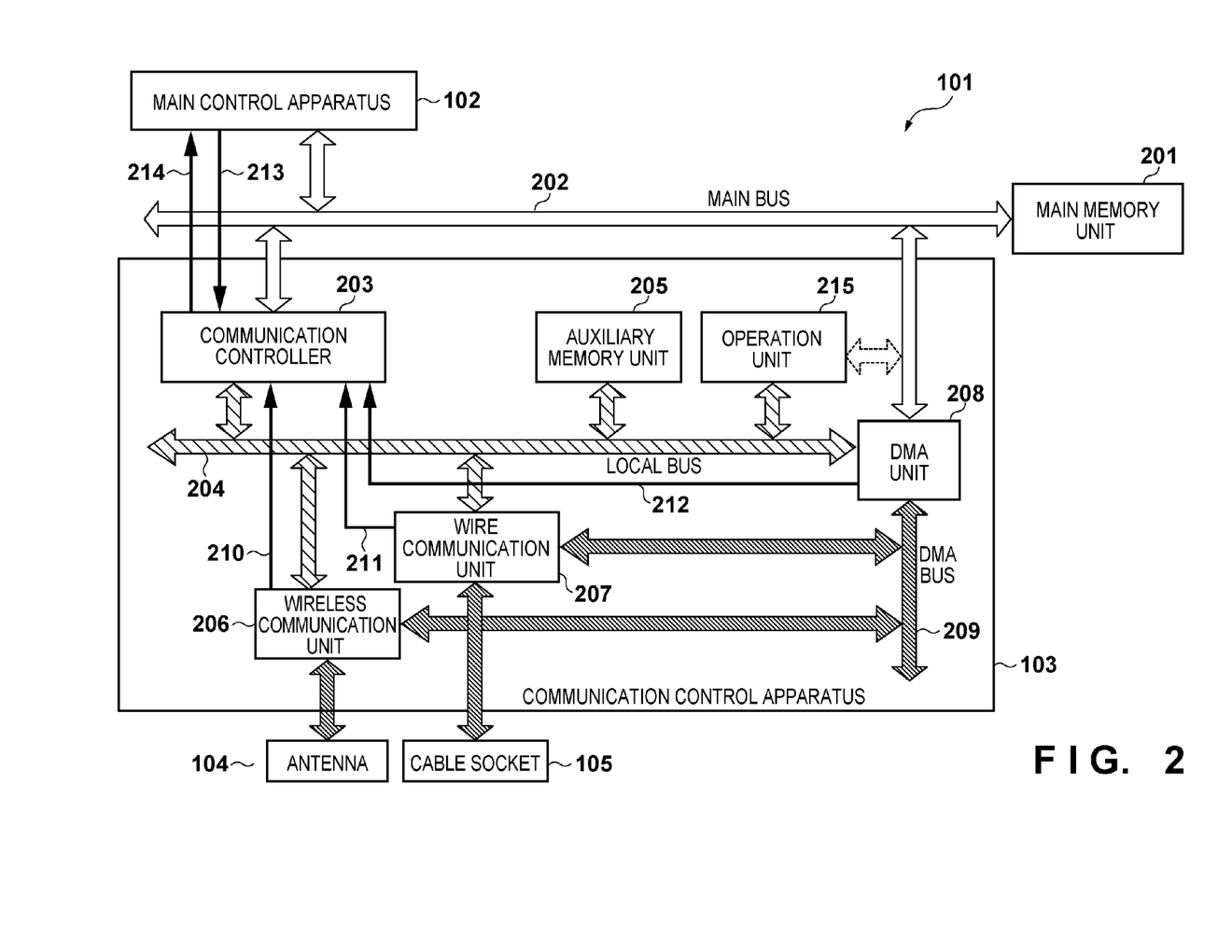
FIG. 2 shows a block diagram indicating an exemplary configuration of a communication control apparatus in the first embodiment.

FIG. 2 is a block diagram presenting an exemplary configuration of the electronic device 101. Referring to FIG. 2, the main memory unit 201 is a memory to which the main control apparatus 102 and communication control apparatus 103 can both access. When sending data, the main control apparatus 102 stores the data in the main memory unit 201, which is sent to a communication partner, and the communication control apparatus 103 packetizes the data stored in the main memory unit 201 and sends it to the communication partner. Further, the main memory unit 201 is also utilized when sending the processed data after the communication control apparatus 103 performs a predetermined protocol process on the data received from the wireless communication apparatus 108 or the wire communication apparatus 109.

The main bus 202 is a bus which connects the main control apparatus 102, the communication control apparatus 103 and main memory unit 201. A communication controller 203 monitors and controls the overall status of the communication control apparatus 103. Detailed operations of the communication controller 203 are explained later. A local bus 204 is connected to various types of modules in the communication control apparatus 103. An auxiliary memory unit 205 is used as a work-memory which is required when the communication control apparatus 103 executes various types of processes. In addition, the main memory unit 201 is connected to the main bus 202 and the auxiliary memory unit 205 is connected to the local bus 204. That is, the main memory unit 201 and the auxiliary memory unit 205 are memories respectively connected to the different buses. In this regard, however, the present invention is not limited to such configuration. For example, the present invention can be applied to a crossbar switch bus to which a multiple bus masters can access at the same time corresponding to a multiple bus slaves, and in this case the configuration is not necessary such that the main memory unit 201 and the auxiliary memory unit 205 are respectively connected to the different buses.

A wireless communication unit 206 performs the process regarding a medium access control and a physical layer that are required to perform wireless communication with the communication partner. The wireless communication unit 206 operates based on the control information from the communication controller 203, and transforms transmitted/received data for the communication partner using DMA bus 209 as described later. When receiving the data, the wireless communication unit 206 generates received data, which can be transferred by the DMA unit 208, using the received signals. When the status of the wireless communication unit 206 changes, an interrupt signal is sent to the communication controller 203 via an interrupt signal line 210 where it allows the wireless communication unit 206 to notify the communication controller 203 of the status change.

A wire communication unit 207 performs the process regarding the medium access control and the physical layer that are required to perform wire-communication with the communication partner. The wire communication unit 207 operates based on the control information from the communication controller 203, and transforms transmitted/received data for the communication partner using DMA bus 209. When data is received, the wire communication unit 207 generates the received data, which can be transferred by the DMA unit 208, using the received signals. When the status of the wire communication unit 207 changes, an interrupt signal is sent to the communication controller 203 via an interrupt signal line 211 and this allows the wire communication unit 207 to notify the communication controller 203 of the occurrence of the status change.

The DMA unit 208 transfers the data, which is read out from the main memory unit 201 or the auxiliary memory unit 205, to wireless communication unit 206 or the wire communication unit 207. Further, the DMA unit 208 can perform the process of transferring the data read-out from the wireless communication unit 206 or the wire communication unit 207 to the main memory unit 201 (a first transferring process) and the process of transferring the received data to the auxiliary memory unit 205 (a second transferring process). In addition, as described later, the second transferring process is performed while transferring the received data in the first transferring process, and a part of the data among the received data (including the portion required for header analysis) is transferred via DMA to the auxiliary memory unit 205. The DMA bus 209 operates when the data is transmitted/received via DMA between the DMA unit 208 and the wire communication unit 207 or wireless communication unit 206.

The interrupt signal line 210 transfers the interrupt signal from the wireless communication unit 206 to the communication controller 203. When receiving the data from external or detecting an abnormal status, the wireless communication unit 206 uses the interrupt signal line 210 to assert the interrupt signal into the communication controller 203. In a similar fashion, the interrupt signal line 211 is the signal line which transfers the interrupt signal from the wire communication unit 207 to the communication controller 203. When receiving the data from external or detecting an abnormal status, the wire communication unit 207 uses the interrupt signal line 211 to assert the interrupt signal into the communication controller 203.

The interrupt signal line 212 is the signal line which transfers the interrupt signal from the DMA unit 208 to the communication controller 203. When completing the DMA process or detecting the abnormal status caused by bus access error and others during the process, the DMA unit 208 uses the interrupt signal line 212 to assert the interrupt signal into the communication controller 203.

The interrupt signal line 213 is the signal line which transfers the interrupt signal from the main control apparatus 102 to the communication controller 203. For example, when required to set an instruction to the communication controller 203, the main control apparatus 102 uses the interrupt signal line 213 to assert the interrupt signal into the communication controller 203. The interrupt signal line 214 is the signal line which transfers the interrupt signal from the communication controller 203 to the main control apparatus 102. When the communication controller 203 completes the process of instruction which is set by the main control apparatus 102 or the error is caused by uncompleted process, the communication controller 203 uses the interrupt signal line 214 to assert the interrupt signal into the main control apparatus 102.

An operation unit 215 internally comprises a register and an adder. The operation unit 215 is connected to the main bus 202, and stores added value of the data passing through the main bus 202. That is, the operation unit 215 performs a process of fetching data in the register to start the addition and a process of updating the register by adding the subsequent data to the added value stored in the register. The operation unit 215 is utilized for error detection and more specifically, utilized for the computation of checksum of TCP header.

In this embodiment, it is assumed that the main memory unit 201 is a DRAM disposed out of LSI chip and the auxiliary memory unit 205 is a on-chip RAM disposed in LSI chip. That is, when comparing to the auxiliary memory unit 205, the main memory unit 201 has superior ability in memory capacity but has inferior ability in access speed. Conversely, although the auxiliary memory unit 205 has smaller capacity than the main memory unit 201, it has superior ability in access speed by the communication controller 203.

Figure 3:
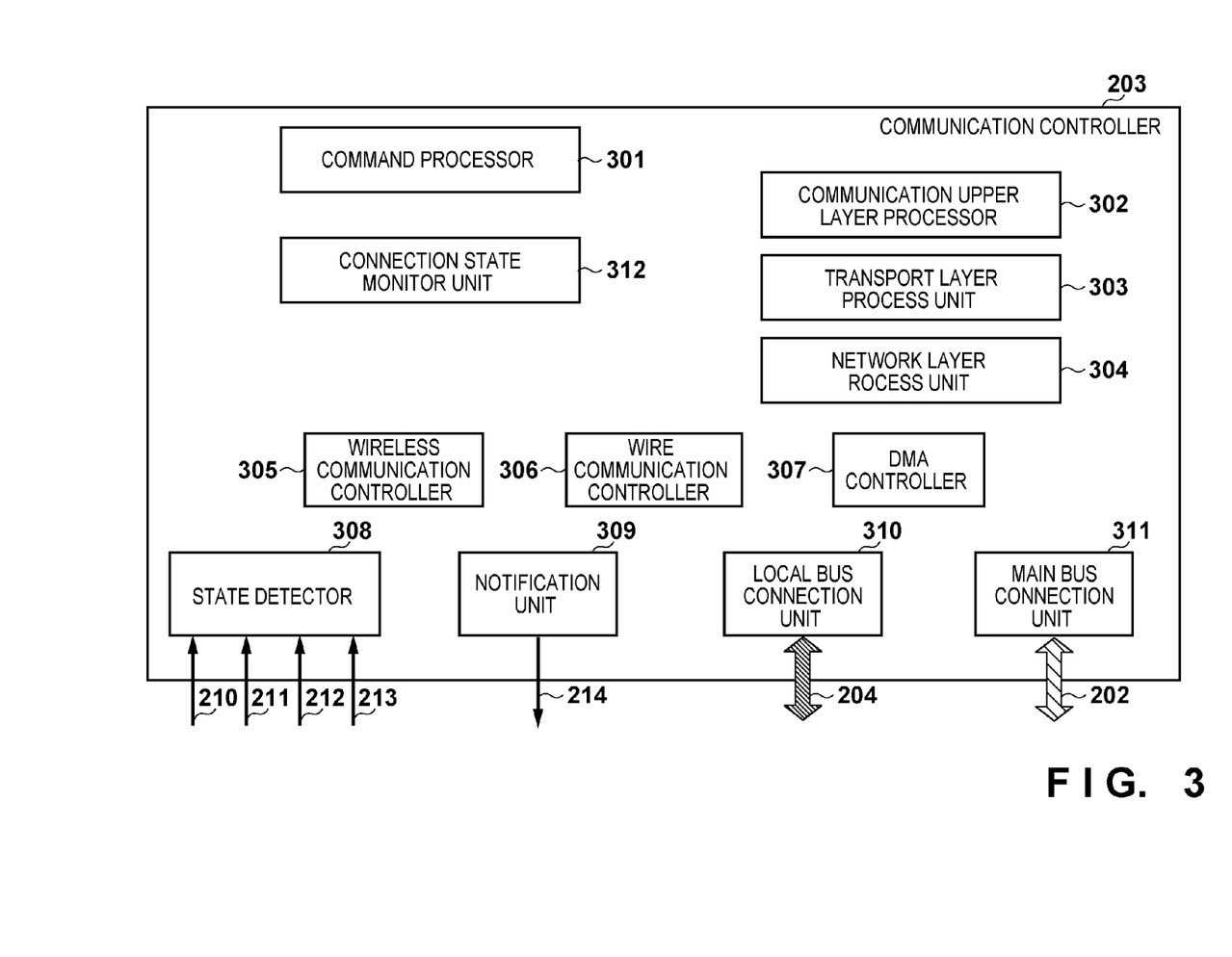
FIG. 3 shows a block diagram indicating an exemplary configuration of a communication controller in the first embodiment.

Next, the configuration and operations of the communication controller 203 are described. FIG. 3 indicates various functions as blocks that are mounted on the communication controller 203 in this embodiment. A command processor 301 analyzes each of various instructions received from the main control apparatus 102 and determines which process should be performed based on the result of the analysis.

A communication upper layer processor 302 processes protocols in the layer, for example, which is higher than a transport layer (fourth layer) of OSI reference model. A transport layer process unit 303 performs the protocol process on the transport layer (fourth layer) of the OSI reference model. In this embodiment, the processed protocol is assumed to correspond to TCP protocol. The network layer process unit 304 performs the protocol process on the network layer (third layer) of the OSI reference model. In this embodiment, the processed protocol is assumed to correspond to an IP protocol.

A wireless communication controller 305 issues a command for initial setting for the wireless communication unit 206 and various types of commands. A wire communication controller 306 issues a command for initial setting for the wire communication unit 207 and various types of commands. A DMA controller 307 performs a start process of transferring and sets a transfer mode and others for the DMA unit 208.

A state detector 308 detects various types of statuses by receiving the interrupt signals from the wireless communication unit 206, the wire communication unit 207, the DMA unit 208 and the main control apparatus 102. Further, the state detection is not limited to such structure using the interrupt signal, and well-known various detection technologies can be applied. For example, registers are provided to indicate the states for the wireless communication unit 206, the wire communication unit 207, the DMA unit 208 and the main control apparatus 102. Further, if the state detector 308 monitors the registers on a regular base or an irregular base, then the monitor of the states can be achieved without the interrupt signals as described above.

When the communication control apparatus 103 sends various types of information to the main control apparatus 102, a notification unit 309 notifies the main control apparatus 102 of information to send using the interrupt signal 214. Note, however, that the interrupt signal is not necessarily required in some structure of the main control apparatus 102. If the main control apparatus 102 regularly monitors the status of the communication controller 203 using the state detector 308 as described above, it is not required to send the interrupt signal. In this embodiment, any method of notifying the information to send may be performed.

A local bus connection unit 310 operates in accordance with the protocol of the local bus 204, and is used for accessing each of various functions in the communication control apparatus 103. In addition, each of various functions in the communication control apparatus 103 may be configured to access the communication controller 203. A main bus connection unit 311 operates in accordance with the protocol of the main bus 202, and is used for accessing each of various functions out of the communication control apparatus 103. In addition, each of various functions out of the communication control apparatus 103 may be configured to access the communication controller 203.

For example, when browsing websites using wireless communication, connections have to be made at each of the layers corresponding to IP, TCP and HTTP. A connection state monitor unit 312 has a function of monitoring connection protocols and connection states in each of the layers as described above.

Figure 4A:
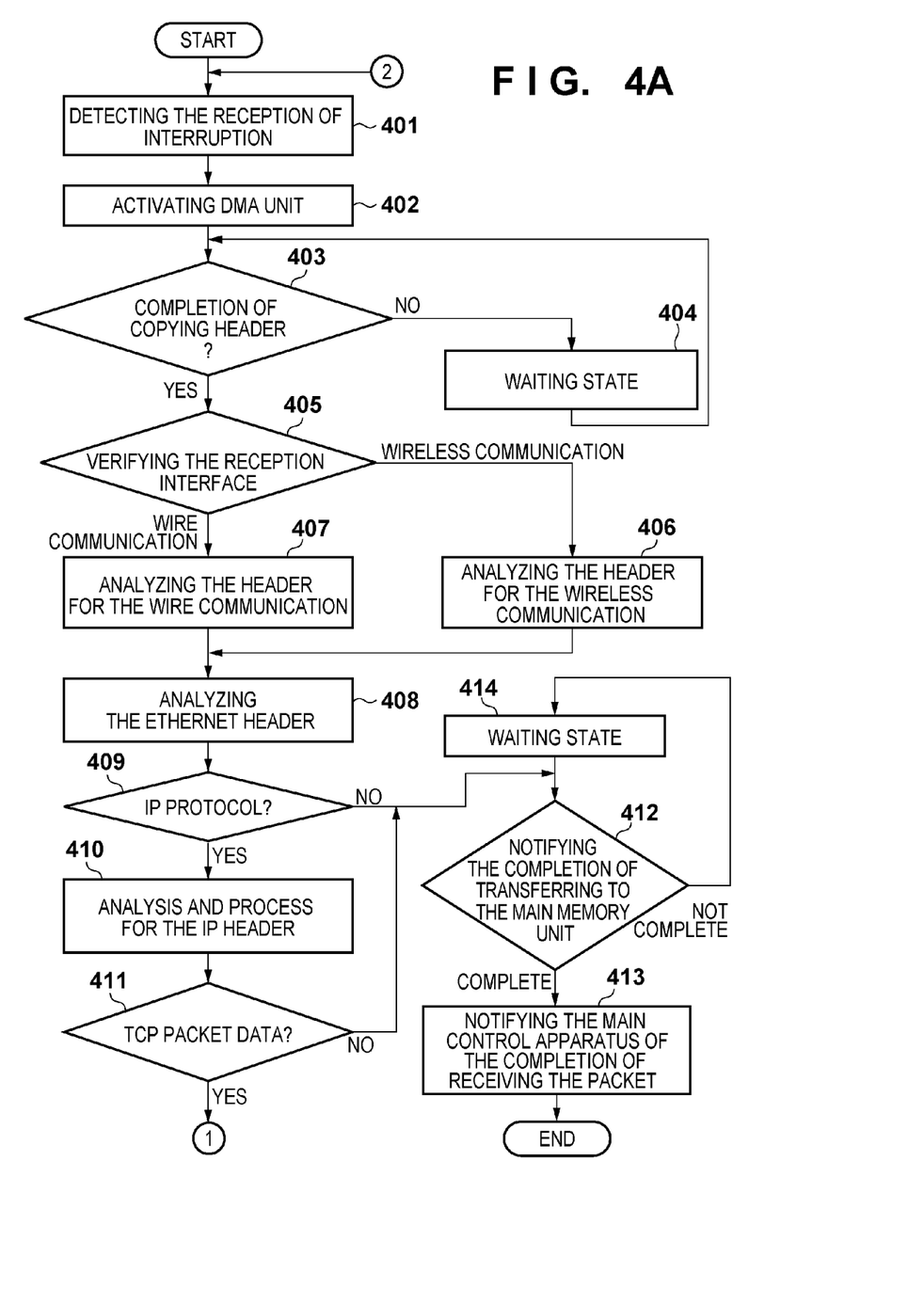
FIGS. 4A and 4B show a flowchart indicating a process of a communication controller in the first embodiment.
Figure 4B:
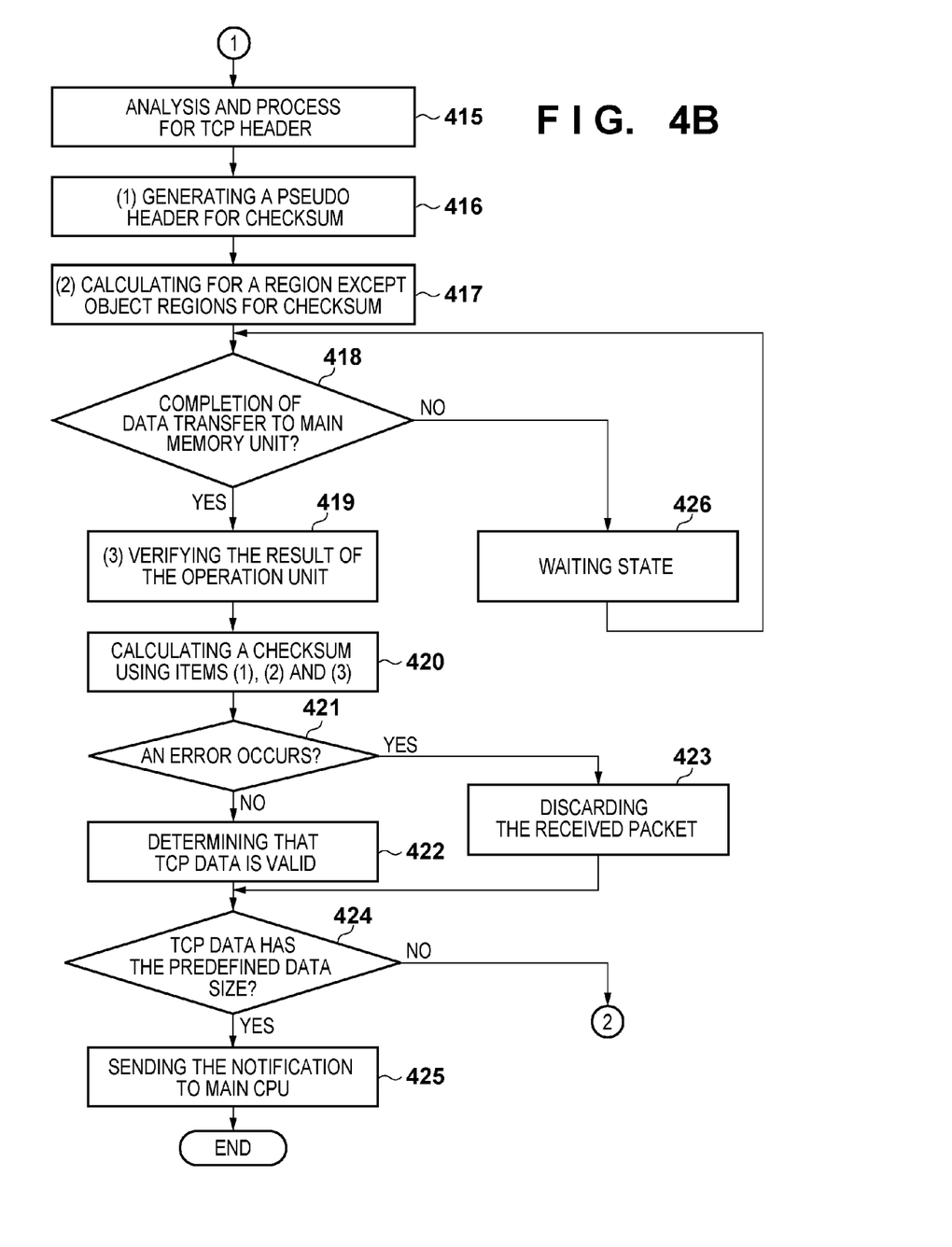

Next, the procedure of processing by the communication controller 203 is described in detail. FIGS. 4A and 4B show a flowchart for the sequence of processing by the communication controller 203 when the communication control apparatus 103 receives TCP/IP packets via the wireless or wire communication.

First, the state detector 308 of the communication controller 203 detects the reception notification from the wireless communication unit 206 or the wire communication unit 207 by the interrupt signal via the interrupt signal line 210 or 211 (Step 401). After that, the DMA controller 307 of the communication controller 203 activates the DMA unit 208 (Step 402). And then, the DMA unit 208 starts copying the received data from the wireless communication unit 206 or the wire communication unit 207 into the main memory unit 201 and the auxiliary memory unit 205. In addition, the DMA unit 208 transfers a portion of the header information of packets to the auxiliary memory unit 205, and transfers the whole packets to the main memory unit 201.

For example, in this embodiment, it is assumed that a part of the data from a start portion of transfer to a TCP header is copied into the auxiliary memory unit 205. If the structure of the packet starts with an IP header, a TCP header and a payload in series, then the IP header and the TCP header are copied into the auxiliary memory unit 205. Further, it is assumed that the operations of copying the received data into the main memory unit 201 and the auxiliary memory unit 205 are started in parallel, but the operation of copying the received data into the main memory unit 201 may start after the operation of copying the received data into the auxiliary memory unit 205 is finished. In addition, the operation of copying into the auxiliary memory unit 205 may start from a MAC header arranged before the IP header in the packet.

Consider that the DMA unit 208 cannot identify a portion regarding header information among portions of the packet before transferring the portion of header information to the auxiliary memory unit 205. In this case, because the DMA unit 208 knows a predetermined maximum length of the header portion of the received packet, it may copy the portion, which is equal to or longer than the maximum length of the header portion from the top of packet, into the auxiliary memory unit 205.

Therefore, the transfer to the auxiliary memory unit 205 is finished before the transfer to the main memory unit 201 is finished. Further, the DMA unit 208 requests the start of the addition operation for the data being copied to the operation unit 215. In addition, it is assumed that all data passing through the DMA bus 209 are calculated as addition objects just after starting to transfer the data to the main memory unit 201. However, when the communication controller 203 can identify either header information or a data portion among the data passing through the DMA bus 209, the operation unit 215 does not necessarily perform the addition operation on the header information.

The communication controller 203 waits until detecting the completion of copying the header from the DMA unit 208 into the auxiliary memory unit 205 (Step 403, 404). After the completion of copying the header into the auxiliary memory unit 205, the DMA unit 208 notifies the communication controller 203 of transfer completion of the header to the auxiliary memory unit 205. After receiving the transfer completion of the header, the communication controller 203 changes the process of analysis for the data portion (header) based on which of the reception interfaces, wire or wireless, is used (Step 405). After changing the process of analysis, the communication controller 203 performs the process of the header which is arranged in front of the header of the Ethernet (registered trademark) II frame described later and which is dependent on the communication interface. That is, when the reception interface is wired and there is a header required in the case of utilizing the wire communication unit 207, the communication controller 203 analyses the header (Step 407). Similarly, when the reception interface is wireless and there is a header required in the case of utilizing the wireless communication unit 206, the communication controller 203 analyses the header (Step 406). In addition, Step 406 and Step 407 may be skipped when there is no header which is dependent on the communication interface.

Next, the header analysis of Ethernet (registered trademark) II frame is performed (Step 408). In this step, the specific analysis for the protocol of the upper layer, i.e. a network layer is performed. For example, Ethernet (registered trademark) II frame has a type field which contains information identifying a protocol type of the upper layer. The communication controller 203 bifurcates the process based on the protocol type (IP or not in this embodiment) (Step 409). In addition, when the protocol of the upper layer is not identified or when the communication controller 203 determines that the process cannot be finished using the protocol in Step 409, the control proceeds to Step 412. Further, the communication controller 203 notifies the main control apparatus 102 of the reception of the data after verifying the transfer completion to the main memory unit 201 via DMA (Step 412, Step 413 and Step 414).

When the IP packet is identified by the header analysis in Step 409, the communication controller 203 performs the analysis and processing of the IP header (Step 410). The analysis performed in this step contains the following listed items: an IP version, an IP header length and a data length, a destination address and an IP header checksum. Moreover, if the IP packet is sent by using IP fragments, the IP packet can be reassembled in this step. The process of reassemble in detail needs not to describe, it is recommended that the process of reassemble is performed by a pointer management so as to reassemble the IP packet even if transferring all data to the main memory unit 201 is not finished.

Next, the process is bifurcated based on the type of protocol in the upper layer (Step 411). If the type of protocol in the upper layer is not TCP, the communication controller 203 cannot continue to perform the process of the received packet. Therefore, the communication controller 203 waits for the transfer completion to the main memory unit 201 by the DMA unit 208 (Step 412, Step 414), and notifies the main control apparatus 102 of the reception (Step 413). If the type of protocol in the upper layer is TCP, the communication controller 203 further performs the analysis and processing of the TCP header (Step 415). Although the analysis and processing of the TCP header in detail needs not be described, likewise with the case of the IP header, the TCP header is also available to be analyzed except for the analysis items, data length and checksum because the TCP header is already stored in the auxiliary memory unit 205. Therefore, the required analysis and process for items except data length and checksum are performed. For example, if it is considered that the destination of the packet is not for oneself or an error exists in the packet, then it may be possible to stop the DMA transfer.

Further, the following preparations will be completed to determine the TCP checksum. First, the communication controller 203 generates a TCP pseudo header for the operation of the TCP checksum and acquires the addition value (Step 416). It is possible to prepare for the TCP pseudo header which is used for the checksum even if the DMA transfer to the main memory unit 201 is not finished because the TCP pseudo header includes a source address, a destination address, a protocol and a TCP length and does not need the information of TCP data portion. Next, the communication controller 203 acquires the addition value for the region except object regions of the TCP checksum operation whose addition operation has already been finished in the operation unit 215 (Step 417). The operation unit 215 starts the addition process from the top part of the data which appears through the main bus 202. Because of this, the addition process may be performed on the information, which does not belong to the object region of the TCP checksum operation, such as an IP header or the information regarding the wireless communication unit 206 or the wire communication unit 207. Therefore, in order to acquire the difference the communication controller 203 preliminarily preforms the addition process for the region except the object region of the checksum operation.

For example, if the packet to be copied into the main memory unit 201 comprises an IP header, a TCP header and a payload, then the communication controller 203 acquires the addition value for the IP header portion as the addition value for the region except the object regions of the TCP checksum operation. IF the packet to be copied into the main memory unit 201 further comprises a MAC header, the communication controller 203 includes the addition value for the MAC header as the addition value for the region except the object regions of the TCP checksum operation.

When finishing the analysis and process except for the data length and checksum within the TCP header, the communication controller 203 can wait for the completion of the DMA transfer if the DMA transfer to the main memory unit 201 has not been complete (Step 418, Step 426). On the other hand, if the communication controller 203 detects the completion of the DMA transfer, it can verify the result because the operation unit 215 also has finished the process of the addition operation (Step 419).

Further, the communication controller 203 acquires the TCP checksum based on the following results:
the additional result of the TCP pseudo header (Step 416),
the additional result for the region except the object regions of the TCP checksum operation (Step 417),
the additional result by the operation unit 215 (Step 419).
Then, the communication controller 203 checks whether or not the data error at the reception might happen (Step 420). Therefore, the communication controller 203 calculates the addition value of the TCP header and the payload by subtracting the additional result for the region except the object regions of the TCP checksum operation from the addition result by the operation unit 215, and checks the data error by verifying the value, which is acquired by adding the calculated addition value to the additional result of the TCP pseudo header, and the checksum value which is attached to the TCP header. In addition, the checksum field of the TCP header is replaced by zero when the checksum is calculated. The process is bifurcated based on the result of the checksum, which shows whether or not the error happened (Step 421). If the data error does not occur, then the communication controller 203 will process the received TCP packet as a valid packet (Step 422). If the data error occurs, then the communication controller 203 will discard the received packet (Step 423).

In this way, the communication controller 203 finishes the sequential processes after receiving one packet, then determines whether the data size of TCP packet reaches the required and predetermined size by the main control apparatus 102 (Step 424). If the communication controller 203 determines that the data size of TCP packet reaches the predetermined size, then it stores the TCP data in the receipt buffer which is prepared by the main control apparatus 102 and sends the notification (Step 425). Then, the communication using TCP is terminated. On the other hand, if the communication controller 203 determines that the data size of TCP packet does not reach the predetermined size, then the control returns to Step 401 in order to continue the process of the reception.

Figure 5:
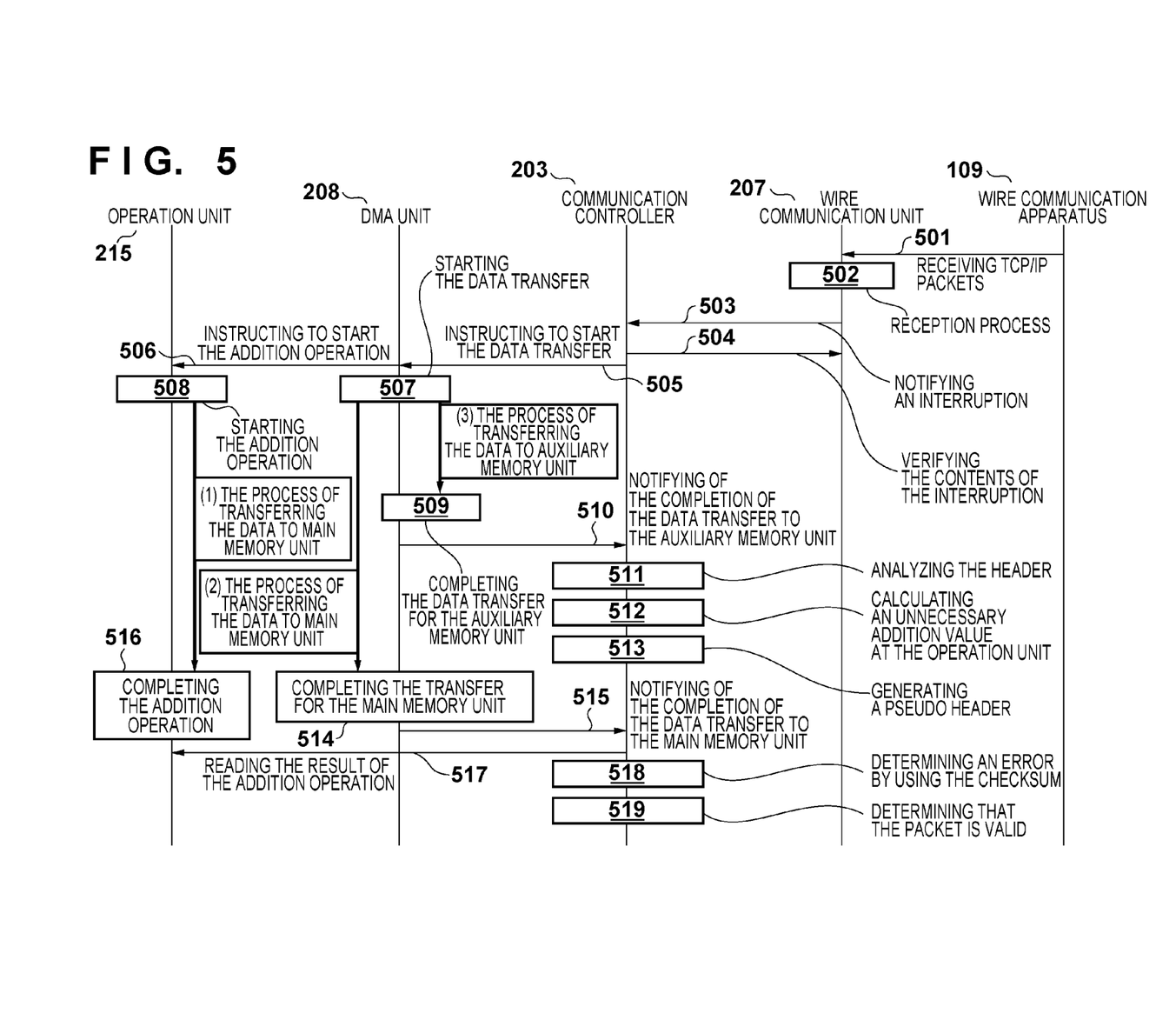
FIG. 5 shows a data flow indicating an exemplary configuration of a communication control apparatus in the first embodiment.

Next, the control information, which is transferred between the functional blocks in the communication control apparatus 103 at the reception of data, will be described. FIG. 5 shows data and control information transferred among the DMA unit 208, the communication controller 203, the wire communication unit 207, the operation unit 215 and the wire communication apparatus 109 when TCP/IP data is received from the wire communication apparatus 109 via wire communication. Here, it is assumed that the reset cancellation or initialization has already applied to the DMA unit 208, the communication controller 203, the wire communication unit 207 and the wire communication apparatus 109, and each unit operates in normal status.

First, when a TCP/IP packet is transmitted from the wire communication apparatus 109 via wire communication (Step 501), the wire communication unit 207 starts the reception process (Step 502). If the reception process is normally performed, the wire communication unit 207 transmits an interrupt signal in order to notify the communication controller 203 of the reception (Step 503). This transmission is performed by using the interrupt signal line 211. The communication controller 203, which has received the interrupt signal via the interrupt signal line 211, inquires the cause of the interruption notification to the wire communication unit 207 (Step 504). If the communication controller 203 determines that the notification is caused by the data reception, it sets the instruction to the DMA unit 208 so that the wire communication unit 207 transfers the received data to the main memory unit 201 and auxiliary memory unit 205 (Step 505). The instruction, which is set here, comprises a transfer destination address and a transfer data size of the main memory unit 201 and a transfer destination address and a transfer data size of the auxiliary memory unit 205. In addition, a portion or all of the contents of the instruction which are set may be predetermined in the DMA unit 208. For example, if the size of the auxiliary memory unit 205 is limited to contain only header information of one packet, the address for the auxiliary memory unit 205 will be fixed. Therefore, if the DMA unit 208 knows of such address in advance, the setting from the external will not be necessary. Further, if the packet is a specific protocol, the maximum length of the header portion will be also predetermined, and then the size setting will not be necessary if the DMA unit 208 is configured to always store the maximum length in the auxiliary memory unit 205. In this way, the communication controller 203 controls the DMA unit 208 to transfer the received data. Further, if the communication controller 203 does not identify the data size when inquiring about the cause by the interruption to the wire communication unit 207, then the transfer data size may not be set but the empty size (remaining size) of the transfer destination may be set. In addition, it is assumed that the transfer data size for the auxiliary memory unit 205 corresponds to at least a data size from the top of the packet to the TCP header.

DMA unit 208 sets the instruction of starting the addition operation to the operation unit 215 simultaneously when the DMA unit 208 is set by the communication controller 203 (Step 506). For example, if the operation unit 215 is populated in the DMA unit 208, it can be configured to start the operation based on the instruction from the communication controller 203, which has set the DMA unit 208. Further, if the operation unit 215 is separated from the DMA unit 208, it may be easy to set the instruction to the operation unit 215 before setting the instruction to the DMA unit 208.

The DMA unit 208, which has received the instruction of data transfer, starts to transfer the data from the wire communication unit 207 to the main memory unit 201 (First transfer process) (Step 507). Further, the DMA unit 208 starts to transfer the data from the wire communication unit 207 to the auxiliary memory unit 205 (Second transfer process) (Step 507). Moreover, at the same time, the operation unit 215 starts the addition operation by snooping the data which is transferred to the main bus 202 (Step 508).

Figure 6A:
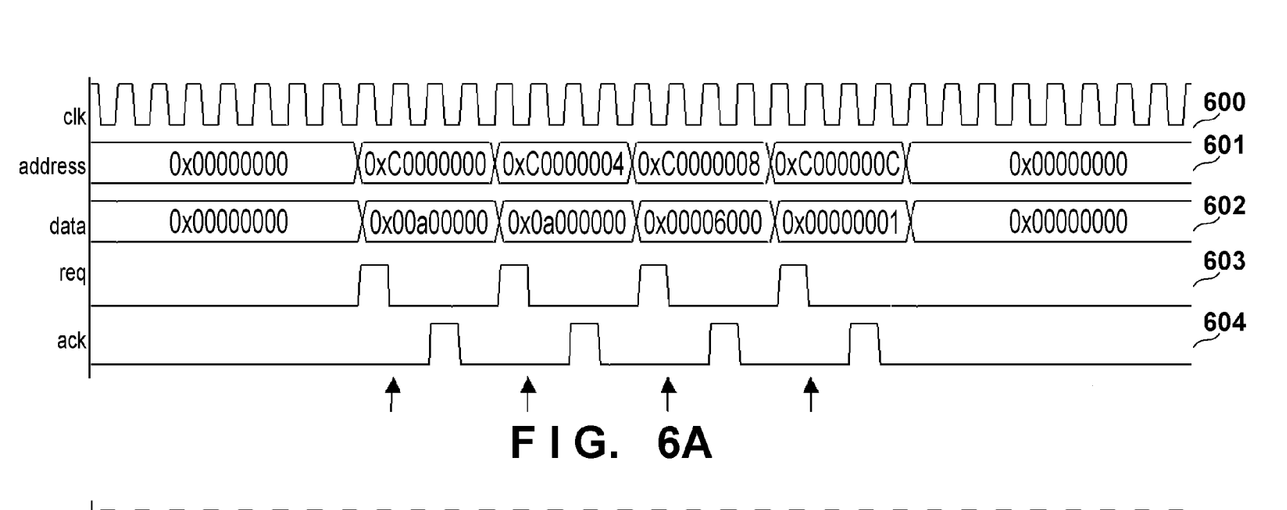
FIGS. 6A and 6B show a timing chart indicating an example of bus operations when using the transfer portion of DMA.

Here, referring to FIGS. 6A and 6B, how the operation unit 215 performs the operation will be described. FIG. 6A shows the timing chart indicating the operations of writing data in general bus arrangement. The reference number 600 indicates a bus clock. The reference numbers 601, 602, 603, 604 respectively indicate an address bus, a data bus, request signal and a response signal. First, a unit for accessing the bus (hereafter, a bus master) sets an address for writing to the address bus 601, and transmits a request signal 603 to the bus while the value of writing is set to the data bus 602. Then, a unit accessed by the bus (hereafter, a bus slave), which has received the address for writing, returns a response signal 604 after the completion of writing. When the bus master receives the response signal 604, it is ready for the next access.

Figure 6B:
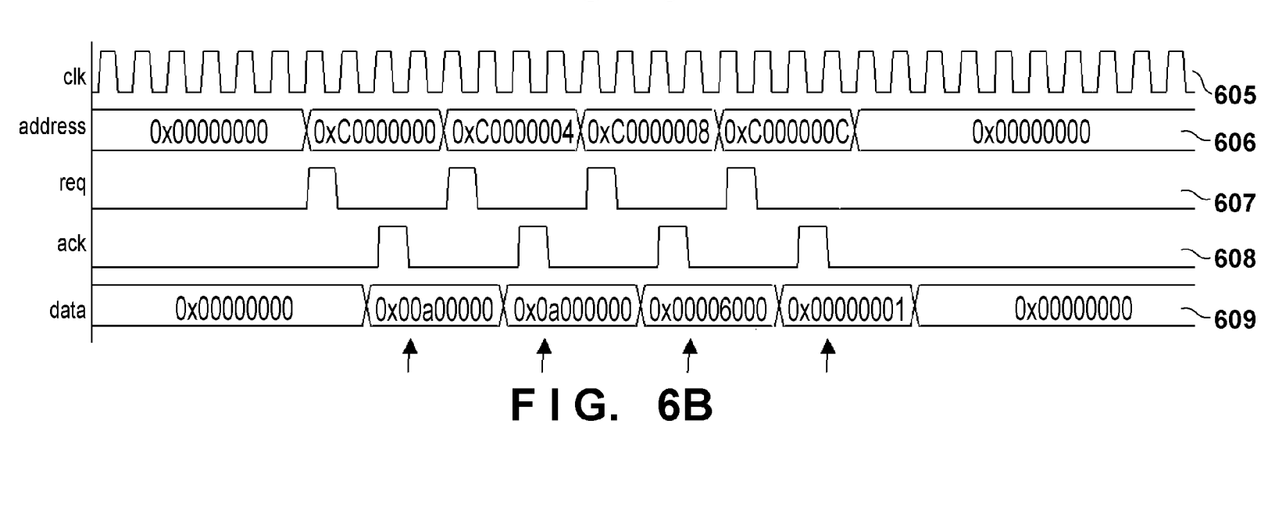

FIG. 6B shows the timing chart indicating the operations of reading out data in general bus arrangement. The reference number 605 indicates a bus clock. The reference numbers 606, 607, 608, 609 indicate respectively an address bus, a request signal, a response signal and a data bus. First, the bus master sets an address for reading out to the address bus 606, and transmits a request signal 607 to the bus. Then, after the bus slave receives the address for reading out, it sets the data delivered to the bus master to the data bus 609, and returns a response signal 608 in order to report the completion of setting. After the bus master receives the response signal 608, it completes the operation of reading out the data by reading a value on the data bus 609 within a specified number of cycles from the moment of inserting the response signal 608.

The operation unit 215 which snoops the bus as shown in FIGS. 6A and 6B, performs the following operations. For example, if the operation unit 215 is connected to the DMA bus 209, the operation unit 215 may snoop the data at the positions indicated by arrows, that is, just after the response signal 608 in FIG. 6B because the DMA bus 209 performs the operation of reading out in FIG. 6B when receiving the data. Further, if the operation unit 215 is connected to the main bus 202 as shown in FIG. 2, the operation unit 215 may snoop the data bus 602 at the positions indicated by arrows, that is, just after the request signal 603 in FIG. 6A because the main bus 202 performs the operation of writing in FIG. 6A when receiving the data.

Reference back to FIG. 5 again, the method is described. After the DMA unit 208 finishes copying (transferring) the predetermined size of the received data from the wire communication unit 207 into the auxiliary memory unit 205 (Step 509), it notifies the communication controller 203 of the result (Step 510). Here, the predetermined size means the data size from the start portion of the transferred data to the TCP header. After the communication controller 203 receives the notification for the copying completion of the predetermined size of the received data into the auxiliary memory unit 205, it accesses the data copied into the auxiliary memory unit 205 and starts analyzing the header (Step 511). Referring to the example in the figure, because only the data from the wire communication unit 207 is processed, it is not necessary to determine whether it receives the data from wireless communication or wire communication. Therefore, assuming that the packet comprises header information regarding the wire communication unit 207 and a subsequent Ethernet (registered trademark) II frame, the analysis is started. In addition, the header information regarding the wire communication unit 207 means information required for status monitor and control of the wire communication unit 207, and its format may be any format by which the communication controller 203 can analyze, but the format may not be used if not required.

The communication controller 203 performs the analysis of a data link layer and further the analysis of a network layer after completing the analysis of the header information regarding the wire communication unit 207. For example, in case of IP communication, the communication controller 203 performs the analysis of an IP header, and further performs the analysis of a predefined protocol after determining the type of the transport layer. As described in the flowchart in FIGS. 4A and 4B, the analysis except for data length and checksum of the TCP header is performed because the example in this embodiment is for the reception of TCP packet.

Further, in order to analyze the checksum of the TCP header, the following processes are performed. The addition value not required for the TCP checksum (hereafter, an unnecessary addition value) is prepared in advance as described in Step 417 (Step 512) because the operation unit 215 simultaneously starts the operation at the time of transferring by the DMA unit 208. Further, the TCP pseudo header required for the TCP checksum operation is prepared before completing the data transfer from the DMA unit 208 to the main memory unit 201 as described in Step 416, and further the summation of the pseudo headers are calculated (Step 513). When the DMA transfer to the main memory unit 201 is finished (Step 514), the DMA unit 208 notifies the communication controller 203 of the completion of DMA transfer (Step 515). Because the operation result of the operation unit 215 is almost simultaneously obtained at the time of the completion of DMA transfer (Step 516), the communication controller 203 refers the result of the addition operation (Step 517). Further, the communication controller 203 determines whether or not an error exists by acquiring the checksum based on the unnecessary addition value, the pseudo header sum value and the operation result which have been obtained in advance (Step 518), and determines whether the finally received packet is valid or not (Step 519).

As observed above, the case where the TCP/IP packet is received from the wire communication unit 207 is described, and the case where the TCP/IP packet is received from the wireless communication unit 206 is similar to this case. That is, the similar procedure may be performed until starting the DMA transfer after receiving the notification of the reception from the wireless communication unit 206. A different point in the procedure is that the first portion to be analyzed in the auxiliary memory unit 205 is not the information regarding the wire communication unit 207 but information regarding the wireless communication unit 206. After finishing the process of this information, the rest of the processing procedure may be similar to the procedure in the case of the wire communication.

Further, it is assumed that all received packets are TCP/IP packets in the above reception method, and more specifically, that the data length is estimated in the neighborhood of 1500 bytes (corresponding to MTU of Ethernet (registered trademark)) in the reception method. First of all, it will be necessary to establish the connection between wireless communication points if the wireless communication is performed using TCP/IP packets. It is necessary to transfer various types of data between the wireless communication unit 206 and the communication controller 203 even in this stage. At this time, the communication controller 203 knows that the data whose length is longer than the length of TCP/IP packet is not sent from the wireless communication unit 206 Further, the communication controller 203 knows that it is not the data that the main control apparatus 102 needs in some system. In this case, the communication controller 203 stops transferring the received data to the main memory unit 201 by the DMA unit 208 because it is not necessary to store the received data in the main memory unit 201. That is, the communication controller 203 can inhibit unnecessary transfer by instructing the DMA unit 208 to transfer via DMA the received data only to the auxiliary memory unit 205. In this way, the power consumption is saved. How to instruct the DMA unit 208 is realized by the connection state monitor unit 312 which is comprised in the communication controller 203. The connection state monitor unit 312 manages the connection status from the beginning to the actual connection, and then it is possible to instruct by designating the way of transfer method for the DMA unit 208 in response to the estimated type and size of the received data with reference to the connection status.

As described above, according to the embodiment, the efficiency of processing the data received from the network is increased. That is, according to the embodiment, the received data and the portion of the received data are respectively copied via DMA into the first memory apparatus, i.e. the main memory unit 201, and the second memory apparatus, i. e. the auxiliary memory unit 205 at the same time. Further, the communication controller 203 can perform header analysis of the received data using the portion of the data stored in the auxiliary memory unit 205 while the received data is transferred via DMA to the main memory unit 201. Here, the main memory unit 201 and the auxiliary memory unit 205 are respectively connected to a different bus. That is, the processing speed is increased because the concentration of the memory access does not happen since the header data copied into the auxiliary memory unit 205, dependent from the main memory unit 201, is used for the header analysis. In addition, the possible arrangement is such that the first transfer process and the header analysis are performed at the same time so as to perform the first transfer process after finishing the second transfer process because the second transfer process is only for the header portion.

Further, the memory size of the auxiliary memory unit 205 can be decreased because only the header size which is required in the received data is extracted and copied into the auxiliary memory unit 205. Moreover, the power consumption is saved because the transfer size is limited to the minimum necessary amount. Furthermore, the header analysis can be processed at high-speed because the header data is stored in the auxiliary memory unit 205 which the communication controller 203 can access at high-speed. In this way, according to this embodiment, the efficiency of the communication process is increased when the data is received from the external apparatus in accordance with the predefined protocol.

Aspects of the present invention can also be realized by a computer of a system or an apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-175735, filed Aug. 4, 2010, which is hereby incorporated by reference herein in its entirety.

What is claimed is:

1. A communication control apparatus comprising:
a receiving unit configured to receive data from an external unit,
a transferring unit configured to transfer first data including a header portion and payload of the data received from said receiving unit to a first memory unit, and to transfer second data including the header portion and a part of payload of the received data to a second memory unit, a size of the second data being smaller than a size of the first data,
an adding unit configured to perform addition operations for the first data transferred to the first memory unit to obtain a checksum value of the received data,
an analyzing unit configured to analyze the second data transferred to the second memory unit in response to the completion of transferring the header portion and the part of payload to the second memory unit,
an acquiring unit configured to, based on the header portion transferred to the second memory unit, acquire an addition value for a region except object regions of checksum for determining an error in the received data, and
a determining unit configured to determine the error in the received data using the result of the addition operation for the first data by said adding unit and the addition value acquired by said acquiring unit,
wherein at least one of the units is included in a computer processor.

2. The communication control apparatus according to claim 1, wherein the first memory unit and the second memory unit are respectively connected to a different bus.

3. The communication control apparatus according to claim 1, further comprising a wireless communication unit and a wire communication unit, wherein
said analyzing unit changes analysis process in response to either the wireless communication unit or a wire communication unit by which the data is received.

4. The communication control apparatus according to claim 1, wherein said transferring unit transfers the first data not to the first memory unit but to the second memory unit while communication for connection setting of wireless communication is performed between other ones of the units.

5. The communication control apparatus according to claim 1, wherein the second memory unit has a smaller memory capacity than the first memory unit has, while the access speed of the second memory from said analyzing unit is faster than that of the first memory unit.

6. The communication control apparatus according to claim 1, wherein said determining unit determines the error in the received data using a value obtained by subtracting the addition value acquired by said acquiring unit from the result of the addition operation for the received data.

7. A control method of a communication control apparatus comprising the following steps of:
transferring first data including a header portion and payload of data received from an external unit to a first memory unit, and transferring second data including the header portion and a part of payload of the received data to a second memory unit, a size of the second data being smaller than a size of the first data,
performing addition operations for the first data transferred to the first memory unit to obtain a checksum value of the received data,
analyzing the second data transferred to the second memory unit in response to the completion of transferring the header portion and the part of payload to the second memory unit,
acquiring, based on the header portion transferred to the second memory unit, an addition value for a region except object regions of checksum for determining an error in the received data, and
determining the error in the received data using the result of the addition operation for the first data in the adding step and the addition value acquired in the acquiring step.

8. A communication control apparatus comprising:
a receiving unit configured to receive data from an external unit,
a transferring unit configured to transfer first data including a header portion and payload of the data received from said receiving unit to a first memory unit, and to transfer second data having a predetermined size for including the header portion and a part of payload of the received data to a second memory unit, the predetermined size of the second data being smaller than a size of the first data,
an adding unit configured to perform addition operations for the first data transferred to the first memory unit to obtain a checksum value of the received data, an analyzing unit configured to analyze the second data transferred to the second memory unit in response to the completion of transferring the header portion and the part of payload to the second memory unit, an acquiring unit configured to, based on the header portion transferred to the second memory unit, acquire an addition value for a region except object regions of checksum for determining an error in the received data, and a determining unit configured to determine the error in the received data using the result of the addition operation for the first data by said adding unit and the addition value acquired by said acquiring unit, wherein at least one of the units is included in a computer processor.

* * * * *